US010039401B1

(12) United States Patent
Romanucci

(10) Patent No.: US 10,039,401 B1
(45) Date of Patent: Aug. 7, 2018

(54) SMART PARCEL SAFE

(71) Applicant: Rebecca Romanucci, Scottsdale, AZ (US)

(72) Inventor: Rebecca Romanucci, Scottsdale, AZ (US)

( * ) Notice: Subject to any disclaimer, the term of this patent is extended or adjusted under 35 U.S.C. 154(b) by 0 days.

(21) Appl. No.: 15/595,578

(22) Filed: May 15, 2017

Related U.S. Application Data

(60) Provisional application No. 62/454,062, filed on Feb. 3, 2017.

(51) Int. Cl.
*G08B 13/14* (2006.01)
*A47G 29/14* (2006.01)
*A47G 29/122* (2006.01)
*A47G 29/126* (2006.01)
*G06Q 10/08* (2012.01)

(52) U.S. Cl.
CPC ......... *A47G 29/141* (2013.01); *A47G 29/126* (2013.01); *A47G 29/1225* (2013.01); *G06Q 10/0833* (2013.01); *A47G 2029/145* (2013.01); *A47G 2029/147* (2013.01)

(58) Field of Classification Search
CPC .................................................. A47G 29/141
USPC ......................................................... 340/569
See application file for complete search history.

(56) References Cited

U.S. PATENT DOCUMENTS

| | | | | |
|---|---|---|---|---|
| 9,626,841 | B2* | 4/2017 | Fadell | G08B 19/005 |
| 2002/0035515 | A1* | 3/2002 | Moreno | A47G 29/141 |
| | | | | 340/5.73 |
| 2004/0100380 | A1* | 5/2004 | Lindsay | G06K 17/0022 |
| | | | | 340/540 |
| 2005/0232747 | A1* | 10/2005 | Brackmann | B60P 3/03 |
| | | | | 414/803 |
| 2006/0033616 | A1* | 2/2006 | Silva | G06Q 10/08 |
| | | | | 340/539.22 |
| 2007/0233709 | A1* | 10/2007 | Abnous | G06F 17/30607 |
| 2008/0067227 | A1* | 3/2008 | Poss | A47G 29/22 |
| | | | | 232/17 |
| 2010/0265068 | A1* | 10/2010 | Brackmann | B60P 3/03 |
| | | | | 340/572.1 |
| 2014/0041558 | A1* | 2/2014 | Lubotta | E05G 1/08 |
| | | | | 109/38 |
| 2015/0156031 | A1* | 6/2015 | Fadell | H04L 12/2816 |
| | | | | 700/276 |
| 2015/0213403 | A1* | 7/2015 | Dorpfeld | G06Q 10/0836 |
| | | | | 705/333 |

(Continued)

*Primary Examiner* — Santiago Garcia
(74) *Attorney, Agent, or Firm* — Parsons & Goltry; Robert A. Parsons; Michael W. Goltry

(57) ABSTRACT

A smart parcel safe including a container defining an enclosure with an opening, a lid attached to the container by hinges and formed to fit over the opening and securely close the enclosure in a closed orientation, the lid being hinged to move from the closed orientation into an open orientation so as to provide access to the enclosure through the opening, a mobile communication device including an app designed to control locking/unlocking of an associated locking mechanism, and an electronically controlled locking mechanism affixed to the container and the lid, the electronically controlled locking mechanism being associated with the mobile communication device so as to be locked/unlocked in response to operation of the mobile communication device.

19 Claims, 7 Drawing Sheets

(56) References Cited

U.S. PATENT DOCUMENTS

2015/0323366 A1* 11/2015 Kekalainen ............ G01D 11/30
                                                                                   702/188
2017/0178072 A1* 6/2017 Poornachandran G06Q 10/0833
2017/0241165 A1* 8/2017 McGinn .............. E05B 63/0065
2017/0296435 A1* 10/2017 Ziv ........................... A61J 7/02

* cited by examiner

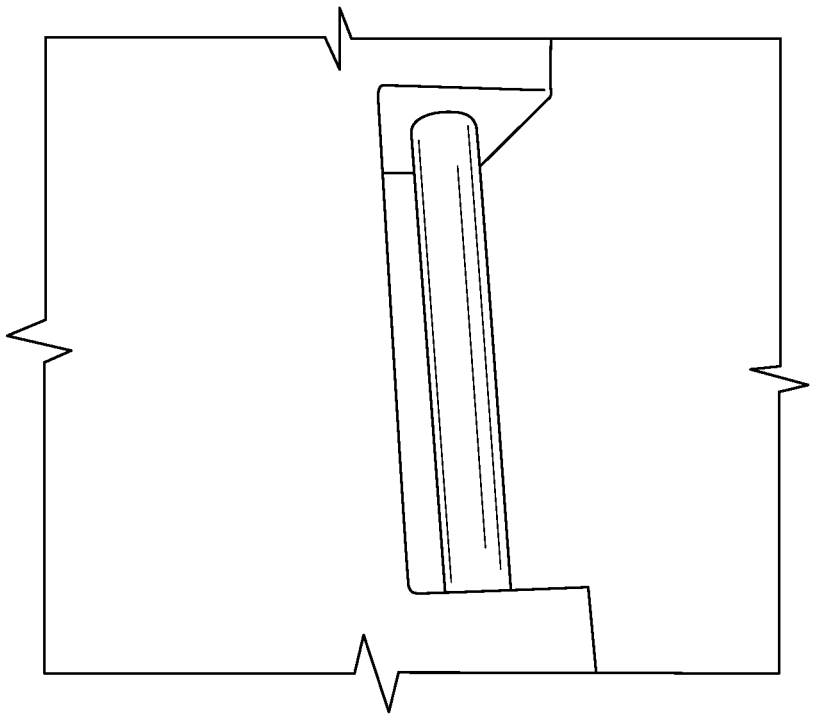
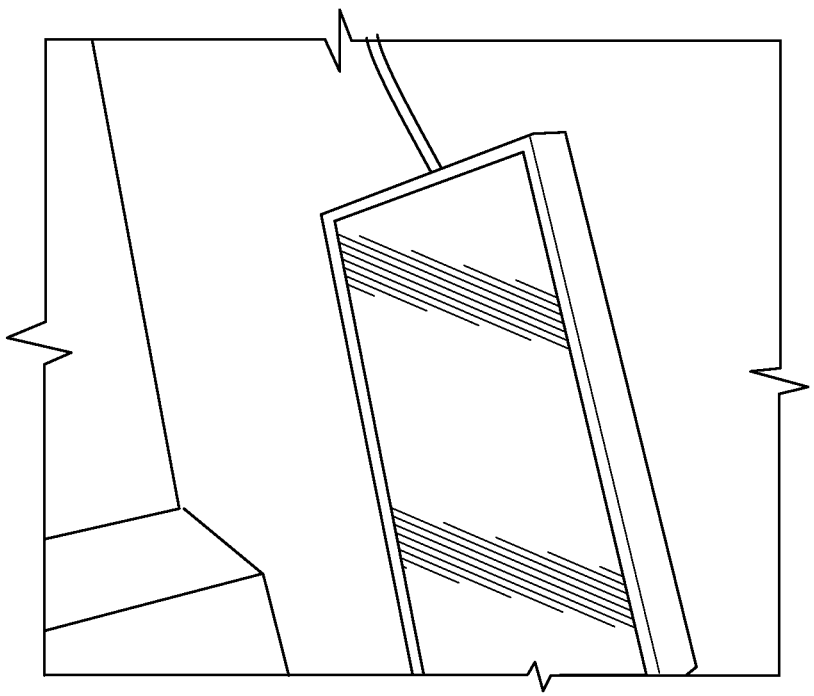

SMART PARCEL SAFE

CROSS-REFERENCE TO RELATED APPLICATION

This application claims the benefit of U.S. Provisional Application No. 62/454,062, filed 14 Feb. 2017.

FIELD OF THE INVENTION

This invention relates to secure safes that include "smart" electronics and apparatus.

BACKGROUND OF THE INVENTION

Hundreds of millions of parcels are delivered to homes and businesses yearly. Many of the parcels are lost, stolen, or damaged. Many deliveries require a signature or require someone to be at the point of delivery. Parcels may be held requiring multiple delivery attempts or requiring the recipient to go to the parcel service, spending gas, and valuable time waiting in long lines. Perishable parcels like groceries, medications, flowers, wine, and more, are either undeliverable, or at risk of being damaged or destroyed by being exposed to elements such as heat, cold, rain, wind, sun and other inclement weather and extreme conditions may also diminish the effect of medication, spoil food, and place people at risk. Mailing a parcel out currently requires a trip to a postal delivery company, or leaving a package exposed on a porch, where it can be damaged or stolen.

It would be highly advantageous, therefore, to remedy the foregoing and other deficiencies inherent in the prior art.

Accordingly, it is an object of the present invention to provide a new and improved smart parcel safe.

It is another object of the present invention to provide a new and improved smart parcel safe that syncs with a mobile device to remotely control functions.

It is another object of the present invention to provide a new and improved smart parcel safe that can sync with any delivery service smart device, or smart devices of other people with which the owner chooses to share.

It is another object of the present invention to provide a new and improved method of providing secure parcel delivery.

It is another object of the present invention to provide a new and improved method of providing secure parcel delivery from a parcel delivery service to an owner.

SUMMARY OF THE INVENTION

Briefly to achieve the desired objects and advantages of the instant invention in accordance with a preferred embodiment a smart parcel safe is provided including a container defining an enclosure with an opening, a lid attached to the container by hinges and formed to fit over the opening and securely close the enclosure in a closed orientation, the lid being hinged to move from the closed orientation into an open orientation so as to provide access to the enclosure through the opening, a mobile communication device including an app designed to control locking/unlocking of an associated locking mechanism, and an electronically controlled locking mechanism affixed to the container and the lid, the electronically controlled locking mechanism being associated with the mobile communication device so as to be locked/unlocked in response to operation of the mobile communication device or any synced mobile communication device.

To further achieve the desired objects and advantages of the present invention a method of providing secure parcel delivery is contemplated. The method includes a step of providing a container defining an enclosure with an opening, a lid attached to the container by hinges and formed to fit over the opening and securely close the enclosure in a closed orientation, the lid being hinged to move from the closed orientation into an open orientation so as to provide access to the enclosure through the opening, and an electronically controlled locking mechanism affixed to the container and the lid, the electronically controlled locking mechanism being associated with a mobile communication device so as to be locked/unlocked in response to operation of the mobile communication device. The method further includes the steps of providing a mobile communication device including an app designed to control locking/unlocking of the associated locking mechanism and syncing the owner mobile communication device with at least one parcel delivery service mobile communication device or other entity mobile communication device to interact with the delivery service or other entity and allow control of the locking/unlocking of the associated locking mechanism through the mobile communication device of the delivery service or other entity.

To further achieve the desired objects and advantages of the present invention a more specific method of providing secure parcel delivery from a parcel delivery service to an owner includes the following steps. The owner: providing a smart parcel safe including a container defining an enclosure with an opening, a lid attached to the container by hinges and formed to fit over the opening and securely close the enclosure in a closed orientation, the lid being hinged to move from the closed orientation into an open orientation so as to provide access to the enclosure through the opening, an electronically controlled locking mechanism affixed to the container and the lid, and an owner mobile communication device including an app designed to control locking/unlocking of an associated locking mechanism; the electronically controlled locking mechanism being associated with the owner mobile communication device so as to be locked/unlocked in response to operation of the owner mobile communication device. The parcel delivery service providing at least one parcel delivery service mobile communication device and syncing the owner mobile communication device with the at least one parcel delivery service mobile communication device to allow control of locking/unlocking of the associated locking mechanism through the at least one parcel delivery service mobile communication device.

BRIEF DESCRIPTION OF THE DRAWINGS

Specific objects and advantages of the invention will become readily apparent to those skilled in the art from the following detailed description of a preferred embodiment thereof, taken in conjunction with the drawings in which:

FIGS. 6A and 6B illustrate two different apparatus for fixing the bench to the porch;

DETAILED DESCRIPTION OF THE DRAWINGS

Figure 1:
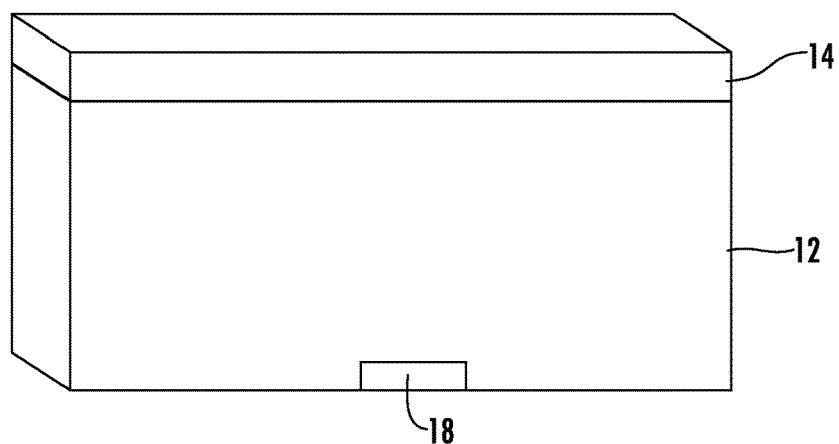
FIG. 1 is a rear view of the smart parcel safe according to the present invention.
Figure 2:
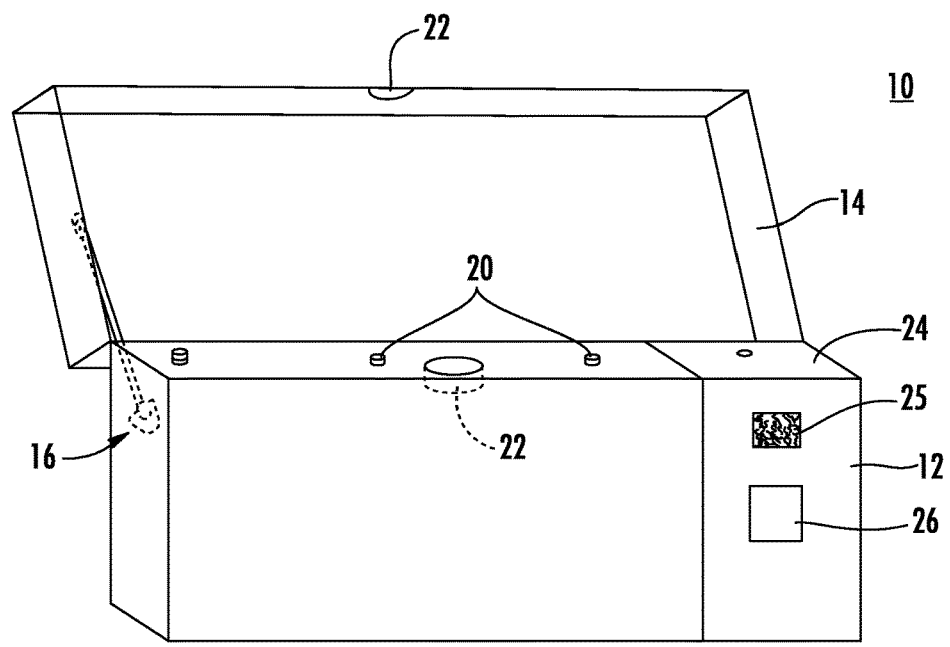
FIG. 2 is a front view of the smart parcel safe, lid open.
Figure 3:
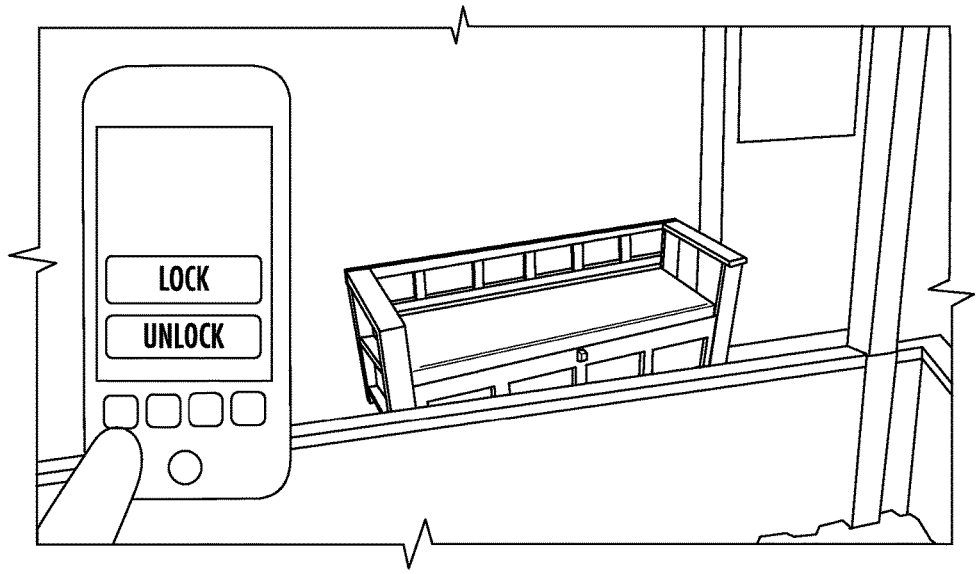
FIG. 3 illustrates the smart parcel safe provided as a bench and further illustrating a typical mobile control unit.
Figure 4:
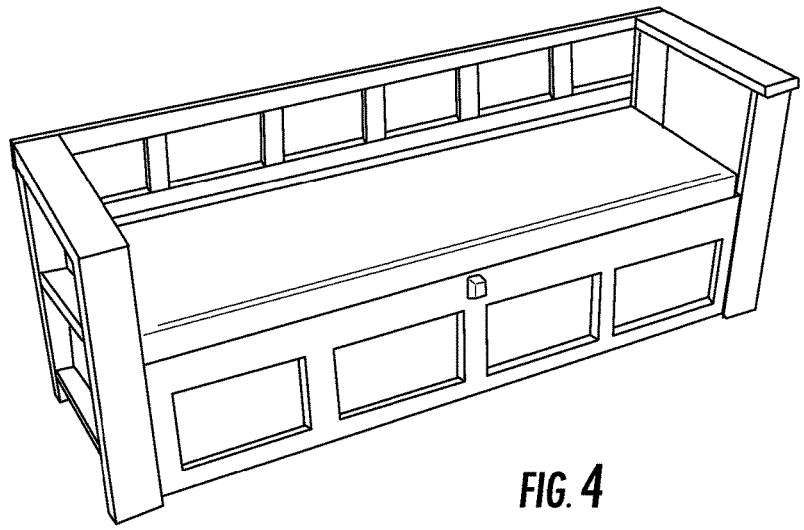
FIG. 4 is an enlarged view of the bench in FIG. 3.
Figure 5:
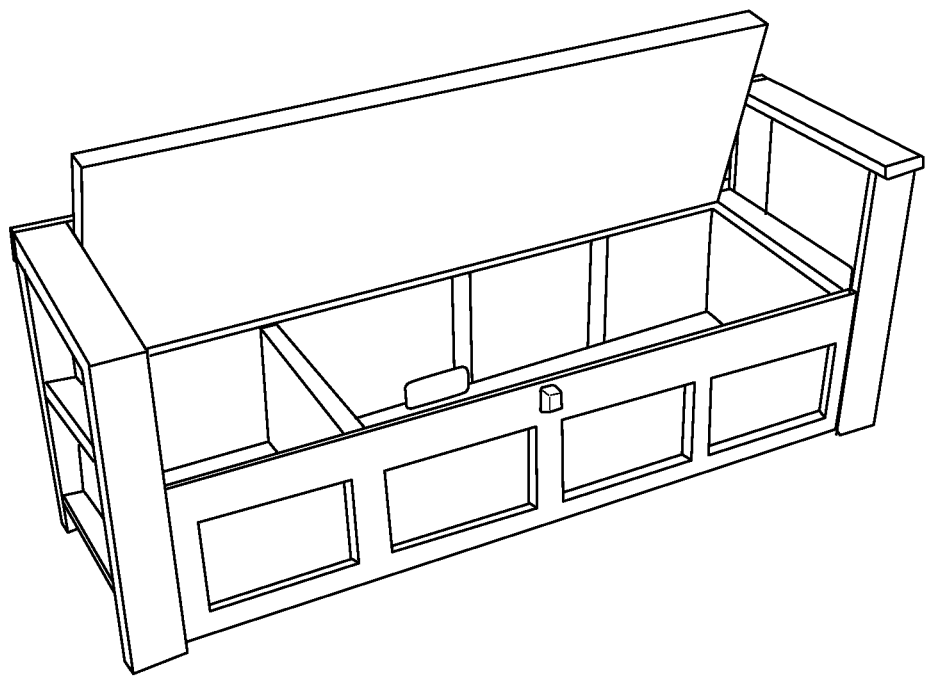
FIG. 5 is a view of the bench in FIG. 3 with the lid in an open configuration.

Turning now to the drawings in which like reference characters indicate corresponding elements throughout the several views, attention is directed to FIGS. 1 and 2 which illustrate a smart parcel safe 10 in accordance with the present invention. Safe 10 includes a main container 12 and a lid 14. In the present specific example, safe 10 is illustrated as a rectangularly shaped box, having an upwardly directed opening closed by lid 14. However, it will be understood that container 12 can have an opening in a front or side, closed by lid 14 operating similar to a door on a refrigerator. Whether lid 14 closes a top, side, front, or back of container 12, it will be considered a lid for convenience. It should also be understood that container 12 is shown as rectangular, but can be provided in any convenient shape. For example, safe 10 might be a stand-alone item or it could be incorporated into some specific piece of lawn or patio furniture, such as a table or bench, and could include a size and shape according to the piece of furniture. One example of a bench configuration is illustrated in FIGS. 3-7.

Generally, it is anticipated that safe 10 will be provided in a variety of sizes and the particular size selected by a user/owner will be in accordance with their specific needs. For example, it is anticipated that safe 10 might be provided in three sizes: a three seater bench; a two seater bench (love seat size); and a smaller item (like a commercially available storage container) for apartments and the like.

Multiple ways of securing container 12 to a porch or patio include metal screws attached to the bottom or base (not shown) or a metal rod or plate 18 affixed to the bottom of container 12, as illustrated in FIG. 6B, and secured to a convenient structure by a cable or chain and lock, as illustrated in FIG. 6A. In a somewhat different arrangement, an additional hollow container, the same size in area as the bottom of container 12, can be added to the bottom of container 12 and filled with heavy material (such as sand) to make safe 10 too heavy to move. In the preferred embodiment a GPS tracking mechanism is included within container 12 both for security and for use in locating safe 10 for delivery purposes, as will be explained in more detail later.

In one embodiment, safe 10 might also be provided as two separate units. The internal unit will look generally like a lightweight plastic cooler (see for example FIG. 5). The exterior will be selected at the time of purchase or separately and may be light weight plastic, faux wood, or other style or design of materials. Exteriors can be changed if desired when a different design or look is desired, e.g. holiday designs, sports teams, etc. Safe 10 can be wall mounted, door mounted, ground mounted, or freestanding with weighted material and can be constructed of any material, like plastic, steel, aluminum, brick, mortar, and wood.

Lid 14 will need to open to at least a vertical orientation and preferably an additional ten or twenty degrees, so that drones can drop deliveries and pick up deliveries. Lid 14 is attached to container 12 by one or more hinges 16 which may be any type of telescoping hinge available on the market. Hinges 16 will need to be controlled by wifi, like the hinges on the back of many SUVs. That is, push a button on the remote, illustrated as the lower button in FIG. 3, and the lid unlocks and is pushed open by the hinges, push a different button, illustrated as the upper button in FIG. 3, and the lid closes and locks.

Safe 10 is electronically "smart" in that it can sync with any smart device, delivery people or other people the owner chooses. Generally, the smart parcel safe is defined to include, in addition to safe 10, an owner mobile communication device (see for example FIG. 3) with an app designed to control locking/unlocking of the associated locking mechanism of safe 10 (see lock 22 described below) and may be interpreted to include one or more synched delivery service mobile communication devices or mobile devices of other entities. The smart functions include: lock, unlock, auto lock, options of presetting, connecting with delivery persons, and exchange of communication such as secure signature including verification with biometric, finger print via the app for secure signature and payment, delivery times, contents, sender, receiver, weight, costs, special instructions, and cooling/heating unit conditions and functions. Safe 10 is trackable due to the GPS tracking mechanism included within container 12 and can include voice controlled, hands free. Safe 10 can also include smart speakers, microphone, ability to record both audio and video, cameras, voice commands, biometric identification, LED lights 20 within container 12, etc. Safe 10 can also communicate with drones or any other type of device which is utilized for deliveries and pick-ups. In one specific example contemplated for use in a smart parcel safe which may be moved from a normal position (e.g. carried by the owner to a different location) the GPS tracking mechanism included within container 12 allows a parcel delivery service or other authorized entity to locate the actual position of the smart parcel safe anywhere within a reasonable area. A drone (for example) can then fly to the location and using a synced communication device, open or unlock the smart parcel safe. In this example, hinges 16 will need to be controlled by wifi as explained above, like the hinges on the back of many SUVs. That is, push a button on the remote in the drone, and the lid unlocks and is pushed open by the hinges, push a different button and the lid is closed by the hinges and locks. Further, lid 14 will need to open to at least a vertical orientation and preferably an additional ten or twenty degrees, so that the drone can drop deliveries and pick up deliveries.

Figure 7:
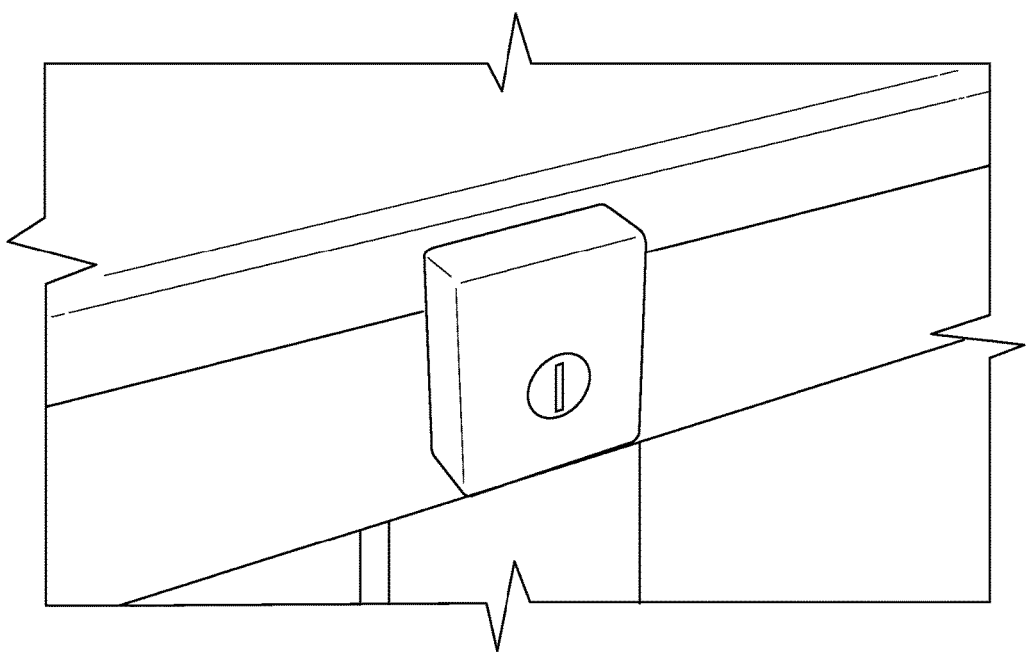
FIG. 7 is an enlarged view of a lock for the bench in FIG. 3.

A portion of a lock 22 is affixed near an upper edge of container 12 and a mating portion is affixed near a lower edge of lid 14 (also illustrated in FIG. 7). Lock 22 is any commercially available electronic device that is operable remotely through any smart device, such as a telephone or the like, through well-known and commercially available apps. Safe 10 automatically locks when it is closed and notification of the status of safe 10, e.g. locked, unlocked, alarm activated because someone jimmied the lock, safe 10 is being moved, etc. is provided through the same app. When a delivery person is standing in front of safe 10 (as illustrated, for example, in FIG. 3), their app, which coordinates with the owner's app, can have preset settings to auto unlock when the delivery person pushes his unlock button, or, the owner can preset safe 10 to send an alert that the delivery person is there and requesting that safe 10 be unlocked at which time the owner can remotely unlock safe 10. The smart functions will also be able to communicate with drones or any mechanical computerized device, so that when a drone is in front of safe 10 with a delivery, or pick-up, the drone can automatically open safe 10, drop or pick up the package and close the safe, at which time it will automatically lock. Here it should be noted that in the preferred embodiment the safe further includes an alarm incorporated to activate in response to unauthorized activity in conjunction with the safe. For example, any movement of the safe, attempts to open the lid, etc. will activate a loud audio device, such as a siren, horn, or the like and generally will also be indicate in some visual display.

As an optional feature, safe 10 can include a smart temperature control refrigeration unit. This is especially useful for owners that receive regular shipments of medicine, wine, food, etc. In the preferred embodiment illustrated in FIGS. 1 and 2, a smart temperature control refrigeration unit 24 is included at the right of container 12 for cooling/heating safe 10. A fan circulation outlet 25 is provided in the front wall of container 12 along with a control and display panel 26. Cooling/heating unit 24 of safe 10 communicates via Bluetooth or a similar concept, so cooling/heating unit 24 can be turned off and on remotely. Generally, Bluetooth and the like only work for short distances which would be sufficient for operation by drones or delivery people. In some special circumstances, cooling/heating unit 24 may be controlled by the same app that operates the other functions, so that it can be turned on and off from the app and also notifies the owner/operator that it is in use and can include the temperature settings and conditions.

Smart temperature control refrigeration units sizes, to cool or warm, vary for different size containers. For a large container the refrigerator unit may be 12 volts preferably provided by two lithium ion batteries, (one of which is removed and recharged when necessary, and the other stays in and runs the unit during the recharging}. As will be understood by the artisan, all of the electronics of safe 10 are energized by the same source of power, in the preferred embodiment the lithium batteries, but which may be provided and/or backed-up by an AC adapter, solar panel adapter, and the like. These temperature control refrigeration units will take up about ⅓ of the space of the larger safe 10, it will take up less than ½ of the space of the middle size container, and it will be the entire space of the smaller container. Even if the refrigeration unit is controlled by an app, the following is preferred. The off/on switch is located at the top of the unit, so that when a delivery is made that needs to have the refrigeration unit on, the delivery person places the items inside, closes the lid and turns the unit on. When the owner/operator takes the items out of safe 10, the unit is easily turned back off. Here it should be noted that safe 10 may be powered by electricity from a source in the nearby building (commercial electricity), batteries (described above), solar panels or various combinations thereof.

Primarily, safe 10 is designed to interact with delivery services such as Fedex, UPS, USPS, food delivery services, flower deliveries, and the like, so that a deliverer may notify the owner via smart device, and can communicate special delivery instructions, package too large for the system, rescheduling a delivery time, and signature confirmation. The system may also provide estimates for outgoing parcels, process secure card payments for outgoing parcels, and the like. Typically, the owner of safe 10 has a mobile communication device that is programmed to interact with the locking mechanism of safe 10 generally referred to herein as an "app". In practice, the app contains some security feature (e.g. password, number, etc.) which allows only the owner to unlock safe 10. In at least one method used in the present system the app, or a portion thereof, for controlling safe 10 is communicated to at least one parcel delivery service, hereinafter referred to as "syncing a mobile communication device of the delivery service". In this fashion the at least one parcel delivery service is authorized to interact with safe 10 and allow control of the locking/unlocking of the associated locking mechanism through a mobile communication device of the delivery service.

Upon delivery of a parcel or package, safe 10 can submit an automatic notification to a synced mobile device, alerting owners of the delivery. Safe 10 can remain locked until accessed by owners via their mobile device or in person. After owners unlock the container and retrieve their package, safe 10 can remain unlocked until the next delivery. Owners may also lock safe 10 and program it to unlock before the next delivery. As explained above, safe 10 may be powered by electricity, batteries, and/or solar panels and can be offered in various shapes and sizes to accommodate user needs. The exact specifications may vary upon manufacturing.

Figure 8:
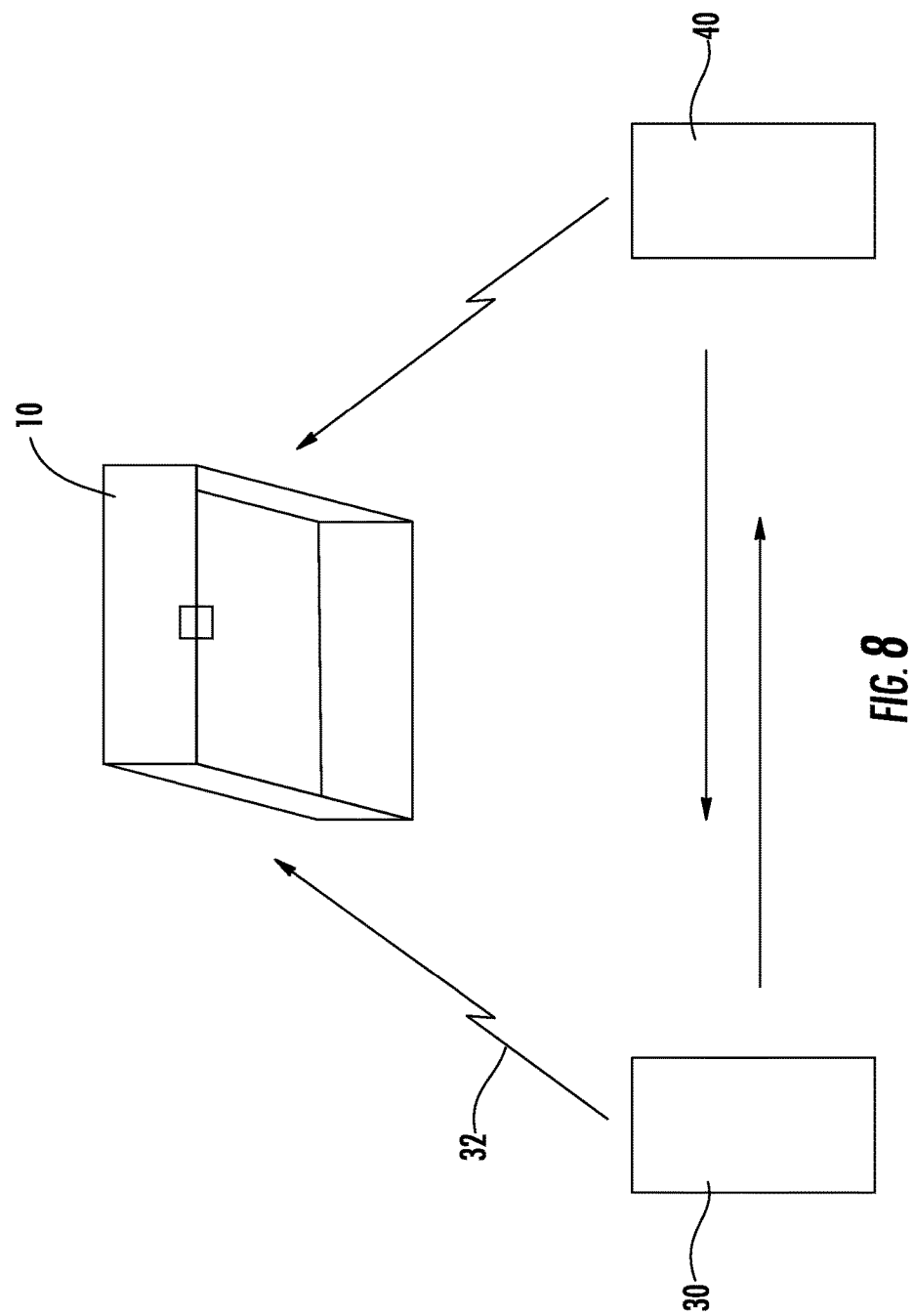
FIG. 8 is a block diagram illustrating the various components of the smart parcel safe system.

Referring to FIG. 8, the smart parcel safe system or operation is summarized in a block diagram illustrating the various components of the smart parcel safe system. Smart parcel safe 10 is provided by an owner who is anticipating receiving parcels from a delivery service and/or from some other party. The owner of smart parcel safe 10 has or otherwise provides a communication device 30, generally a mobile smart phone or other mobile communication device. Communication device 30 includes an app for communicating with smart parcel safe 10 to lock and unlock safe 10, indicated by line 32. For purposes of safely delivering a parcel to the owner, a parcel delivery service or other entity is contacted by the owner in a normal business or personal fashion. To provide and promote the safe delivery, the parcel delivery service or other entity provides a mobile communication device 40 which, in communication with owner communication device 30, receives the app for communicating with smart parcel safe 10. When the parcel delivery service or other entity delivers a parcel, they use mobile communication device 40 to unlock safe 10. They then place the parcel in safe 10, close the lid and, in instances where safe 10 does not automatically lock when closed, the parcel delivery service or other entity uses mobile communication device 40 to lock safe 10. The parcel delivery service or other entity may or may not communicate to the owner through mobile communication device 40 and owner communication device 30 that the parcel has been delivered. The owner can then use owner communication device 30 to open safe 10, remove the parcel and again lock safe 10.

Figure 9:
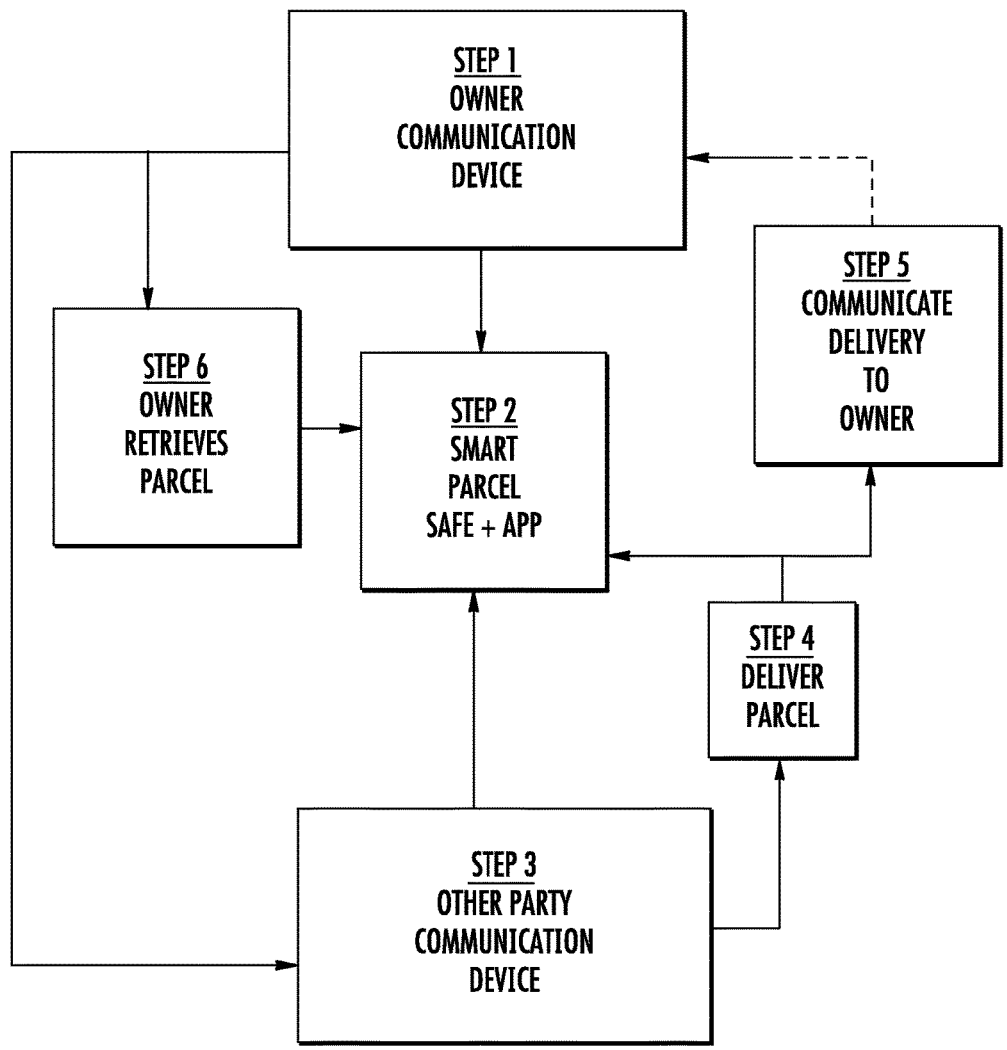
FIG. 9 is a flow chart illustrating the sequential steps in the process.

Referring additionally to FIG. 9, a flow chart is provided illustrating generally sequential steps in the safe parcel delivery process. In STEP 1, the owner provides (generally already owns) a communication device 30, generally a mobile smart phone or other mobile communication device. In STEP 2, the owner provides a smart parcel safe 10 and installs or otherwise places an app in communication device 30 that is capable of locking and unlocking safe 10. In STEP 3, the owner communicates with a parcel delivery service or other entity in a normal business or personal fashion and determines that they have a smart communication device 40. In this step the owner syncs communication device 30 with communication device 40 by introducing the app into communication device 40. In STEP 4, the parcel delivery service or other entity delivers a parcel to safe 10, using communication device 40 to unlock safe 10, open safe 10 and place the parcel inside, close the lid and again using communication device 40 lock safe 10. In an optional STEP 5, the parcel delivery service or other entity notifies the owner that the parcel has been delivered, this may be through communication device 40 to communication device 30 or by some other means of communication. In STEP 6, as a final step, the owner retrieves the parcel from safe 10 by using communication device 40 to unlock safe 10, remove the parcel and then using communication device 40 to lock safe 10 (assuming safe 10 does not lock automatically when closed.

Thus, a new and improved smart parcel safe is disclosed which syncs with mobile devices to remotely control functions. The smart parcel safe can sync with any smart device, delivery people, or other people with which the owner chooses to share and is constructed to inconvenience thieves and the like. Also, the smart parcel safe can be provided in various configurations of different complexities from a simple container that can be remotely locked and unlocked from a mobile device to a container including a heating/cooling unit and/or various communication devices (e.g. alarms, video/audio, etc.) Also a new and improved smart parcel safe delivery system or operation is disclosed.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A smart parcel safe designed to receive and protect parcels delivered to an owner by a delivery service comprising:
    an owner-container defining an enclosure with an opening and a lid attached to the owner-container by hinges and formed to fit over the opening and securely close the enclosure in a closed orientation, the lid being hinged to move from the closed orientation into an open orientation so as to provide access to the enclosure through the opening;
an electronically controlled locking mechanism affixed to the owner-container and the lid;
the smart parcel safe including a smart temperature control refrigeration unit attached to the owner-container and positioned to control temperatures in the owner-container;
    an owner mobile communication device and a delivery service mobile communication device each including an app application installed thereon designed to remotely control locking/unlocking of the electronically controlled locking mechanism; and
wherein the smart temperature control unit attached to the container is responsive to one of an off/on switch on the smart parcel safe, the app included in the owner mobile communication device or the delivery service mobile communication device so as to control the unit to one of cooling and heating in response to operation of either the off/on switch, the owner mobile communication device or the delivery service mobile communication device; and
    the electronically controlled locking mechanism being responsive to the app application included in the owner mobile communication device and the delivery service mobile communication device so as to be remotely locked/unlocked in response to operation of either the owner mobile communication device or the delivery service mobile communication device, whereby parcels can be securely delivered to the owner via the smart parcel safe by the delivery service.

2. The smart parcel safe as claimed in claim 1 and further including apparatus affixing the safe to a permanent immovable structure to retard unauthorized movement.

3. The smart parcel safe as claimed in claim 2 wherein the apparatus affixing the safe to a permanent structure includes, screws, bolts, a bar imbedded in the container with associated cable or chain, and heavy additional portion attached to the container.

4. The smart parcel safe as claimed in claim 1 wherein the hinges further include electronically controllable hinges responsive to the owner mobile communication device or the delivery service mobile communication device so as to move the lid between the closed orientation and the open orientation in response to operation of the owner mobile communication device or the delivery service mobile communication device.

5. The smart parcel safe as claimed in claim 1 wherein electrical power is provided by at least one of commercial electricity, batteries, and/or solar panels.

6. The smart parcel safe as claimed in claim 1 wherein the safe is included in an article of furniture.

7. The smart parcel safe as claimed in claim 6 wherein the article of furniture includes a bench with the lid forming a seat of the bench.

8. The smart parcel safe as claimed in claim 1 wherein the safe further includes an alarm, visual and/or audible, incorporated to activate in response to unauthorized activity in conjunction with the safe.

9. The smart parcel safe as claimed in claim 1 further comprising a GPS tracking mechanism included with the container and self opening hinges connected between the container and the lid, whereby when the lid is unlocked the lid is pushed open by the hinges and the hinges are controllable to close and lock the lid.

10. A method of providing secure parcel delivery to an owner comprising the steps of:
    providing an owner smart parcel safe including a container defining an enclosure with an opening, a lid attached to the container by hinges and formed to fit over the opening and securely close the enclosure in a closed orientation, the lid being hinged to move from the closed orientation into an open orientation so as to provide access to the enclosure through the opening, and an electronically controlled locking mechanism affixed to the container and the lid, the electronically controlled locking mechanism being associated with a mobile communication device so as to be locked/unlocked in response to operation of the mobile communication device;
    providing an owner mobile communication device including an app application installed thereon designed to remotely control locking/unlocking of the associated locking mechanism; and
providing a smart temperature control unit attached to the owner-container and positioned to control temperatures in the owner-container;
    syncing the owner mobile communication device with at least one parcel delivery service mobile communication device or other entity mobile communication device to interact with the delivery service or other entity and allow remote control of the locking/unlocking of the associated locking mechanism through the mobile communication device of the delivery service or other entity and parcel delivery to the owner smart parcel safe container; and
controlling the the smart temperature control unit attached to the container in responsive to operation of one of an off/on switch on the smart parcel safe, the owner mobile communication device or the at least one delivery service mobile communication device so as to control the unit to one of cooling and heating.

11. The method as claimed in claim 10 and further including the step of providing apparatus affixing the safe to a permanent immovable structure to retard unauthorized movement.

12. The method as claimed in claim 10 further including a step of providing electronically controllable hinges associated with the owner mobile communication device so as to move the lid between the closed orientation and the open orientation in response to operation of the owner mobile communication device or other synced mobile device.

13. The method as claimed in claim 10 further including a step of providing a smart temperature control refrigeration unit within/attached to the container, the smart temperature control refrigeration unit responsive to one of an off/on switch on the owner smart parcel safe or the owner mobile communication device so as to control the unit to one of cooling and heating in response to operation of the off/on switch, the owner mobile communication device or other synced mobile device.

14. The method as claimed in claim 10 further including a step of providing electrical power to the safe by at least one of commercial electricity, batteries, and/or solar panels.

15. The method as claimed in claim 10 including a step of providing an alarm, visual and/or audible, incorporated in the safe to activate in response to unauthorized activity in conjunction with the safe.

16. The method as claimed in claim 10 wherein the step of syncing the mobile communication device with at least one parcel delivery service or other entity to interact with the delivery service includes communicating special delivery instructions from the mobile communication device of the delivery service or other entity to the owner mobile communication device or from the owner mobile communication device to the mobile communication device of the delivery service or other entity.

17. A method of providing secure parcel delivery from a parcel delivery service to an owner comprising the steps of:
the owner: providing a smart parcel safe including a container defining an enclosure with an opening, a lid attached to the container by hinges and formed to fit over the opening and securely close the enclosure in a closed orientation, the lid being hinged to move from the closed orientation into an open orientation so as to provide access to the enclosure through the opening, an electronically controlled locking mechanism affixed to the container and the lid, and an owner mobile communication device including an app designed to control locking/unlocking of an associated locking mechanism; the electronically controlled locking mechanism being associated with the owner mobile communication device so as to be locked/unlocked in response to operation of the owner mobile communication device;
the parcel delivery service providing at least one parcel delivery service mobile communication device; and
providing a smart temperature control unit attached to the container and positioned to control temperatures in the container;
syncing the owner mobile communication device with the at least one parcel delivery service mobile communication device to allow control of locking/unlocking of the associated locking mechanism through the at least one parcel delivery service mobile communication device; and
controlling the smart temperature control unit attached to the container in responsive to operation of one of an off/on switch on the smart parcel safe, the owner mobile communication device or the at least one delivery service mobile communication device so as to control the unit to one of cooling and heating.

18. The method as claimed in claim 17 further including steps of: the parcel delivery service delivering a parcel to the smart parcel safe using the at least one parcel delivery service mobile communication device to unlock the associated locking mechanism and locking the associated locking mechanism after placing the parcel in the container; and subsequently the owner opening the smart parcel safe, removing the parcel and closing the smart parcel safe.

19. The method as claimed in claim 17 wherein the step of syncing the owner mobile communication device with the at least one parcel delivery service mobile communication device to interact with the delivery service further includes communicating special delivery instructions from the mobile communication device of the delivery service to the owner mobile communication device or from the owner mobile communication device to the mobile communication device of the delivery service.

\* \* \* \* \*